US012588111B2

(12) United States Patent
Thorens et al.

(10) Patent No.: US 12,588,111 B2
(45) **Date of Patent: *Mar. 24, 2026**

(54) HEATER FOR AN ELECTRICALLY HEATED AEROSOL GENERATING SYSTEM

(71) Applicant: Philip Morris USA Inc., Richmond, VA (US)

(72) Inventors: Michel Thorens, Moudon (CH); Jean-Marc Flick, Pomy (CH); Olivier Yves Cochand, Dombresson (CH); Flavien Dubief, Neuchatel (CH)

(73) Assignee: PHILIP MORRIS USA INC., Richmond, VA (US)

( * ) Notice: Subject to any disclaimer, the term of this patent is extended or adjusted under 35 U.S.C. 154(b) by 732 days.

This patent is subject to a terminal disclaimer.

(21) Appl. No.: 18/052,642

(22) Filed: Nov. 4, 2022

(65) Prior Publication Data

US 2023/0113967 A1 Apr. 13, 2023

Related U.S. Application Data

(63) Continuation of application No. 15/997,244, filed on Jun. 4, 2018, now Pat. No. 11,516,889, which is a (Continued)

(30) Foreign Application Priority Data

Dec. 30, 2009 (EP) .................................... 09252923

(51) Int. Cl.

| | |
|---|---|
| ***H05B 3/58*** | (2006.01) |
| ***A24F 40/46*** | (2020.01) |
| *A24F 40/10* | (2020.01) |

(52) U.S. Cl.
CPC ............... *H05B 3/58* (2013.01); *A24F 40/46* (2020.01); *A24F 40/10* (2020.01)

(58) Field of Classification Search
CPC .......... A24F 40/00; A24F 40/10; A24F 40/20; A24F 40/40; A24F 40/42; A24F 40/44;
(Continued)

(56) References Cited

U.S. PATENT DOCUMENTS 1,013,157 A 1/1912 Hadaway, Jr.
5,228,460 A 7/1993 Sprinkel et al.
(Continued)

FOREIGN PATENT DOCUMENTS

CN 218185256 U * 1/2023
EP 0608783 A1 8/1994
(Continued)

OTHER PUBLICATIONS

Search Report dated Jun. 2, 2010 for European Patent Application No. 09252923.9-2214.
Australian Office Action mailed Oct. 31, 2018.

*Primary Examiner* — Hung D Nguyen
(74) *Attorney, Agent, or Firm* — Harness, Dickey & Pierce, P.L.C.

(57) ABSTRACT

An electrically heated aerosol generating system for receiving an aerosol-forming substrate includes at least one electric heater for heating the aerosol-forming substrate to form the aerosol. The heater includes a heating element of a first cross section electrically connected to a plurality of elongate support elements. Each support element has a cross section greater than the first cross section. At least one of the support elements is integrally formed with the heating element.

20 Claims, 4 Drawing Sheets

Related U.S. Application Data continuation of application No. 14/732,206, filed on Jun. 5, 2015, now Pat. No. 9,986,761, which is a continuation of application No. 12/975,894, filed on Dec. 22, 2010, now Pat. No. 9,055,617.

(58) Field of Classification Search
CPC .. A24F 40/46; H05B 3/00; H05B 3/02; H05B 3/10; H05B 3/12; H05B 3/40; H05B 3/42; H05B 3/44; H05B 3/54; H05B 3/58
See application file for complete search history.

(56) References Cited

U.S. PATENT DOCUMENTS

| | | | |
|---|---|---|---|
| 5,388,594 | A | 2/1995 | Counts et al. |
| 5,591,368 | A | 1/1997 | Fleischhauer et al. |
| 2008/0022999 | A1 | 1/2008 | Belcastro et al. |

FOREIGN PATENT DOCUMENTS

| | | | | |
|---|---|---|---|---|
| EP | 2113178 | A1 | 11/2009 | |
| WO | WO-2007078273 | A1 | 7/2007 | |
| WO | WO-2022062444 | A1 * | 3/2022 | ............. A24F 40/46 |

* cited by examiner

HEATER FOR AN ELECTRICALLY HEATED AEROSOL GENERATING SYSTEM

CROSS REFERENCE TO RELATED APPLICATION

This application is a continuation of U.S. application Ser. No. 15/997,244, filed Jun. 4, 2018, which is a continuation of U.S. application Ser. No. 14/732,206, filed Jun. 5, 2015, which is a continuation of U.S. application Ser. No. 12/975,894, filed Dec. 22, 2010 entitled IMPROVED HEATER FOR AN ELECTRICALLY HEATED AEROSOL GENERATING SYSTEM which corresponds to and claims priority under 35 U.S.C. § 119 to European Application No. 09252923.9, filed Dec. 30, 2009, the entire contents of each is of which are hereby incorporated by reference.

WORKING ENVIRONMENT

WO-A-2007/078273 discloses an electric smoking utensil. A liquid is stored in a container which communicates with a heater vaporizer, powered by a battery supply, via a series of small apertures. The heater is in the form of a spirally wound electric heater mounted on an electrically insulating support. In use, the heater is activated by the mouth of the user to switch on the battery power supply. Suction on a mouthpiece by a user causes air to be drawn through holes in the container, over the heater vaporizer, into the mouthpiece and subsequently into the mouth of the user.

One disadvantage of such a proposed smoking utensil is that it is relatively difficult to manufacture such a heater.

SUMMARY OF SELECTED FEATURES OF THE PREFERRED EMBODIMENT

In a preferred embodiment, an electrically heated aerosol generating system for receiving an aerosol-forming substrate includes: at least one electric heater for heating the aerosol-forming substrate to form the aerosol. The heater includes a heating element of a first cross section electrically connected to a plurality of elongate support elements. Preferably, each support element having a cross section greater than the first cross section. Also preferably, at least one of the support elements is integrally formed with the heating element.

Preferably, the aerosol-forming substrate is a liquid aerosol-forming substrate. Also preferably, the system further includes a liquid storage portion for holding the liquid and a capillary wick in communication with the liquid storage portion.

In the preferred embodiment, each of the support elements further includes an electrically positive connector or an electrically negative connector. Preferably, the heating element includes a flexible heating element extending between the support elements. Also preferably, the heating element includes a sheet of electrically resistive material. Moreover, the heating element includes portions extending substantially parallel to the support elements and portions extending substantially perpendicular to the support elements joining the portions extending substantially parallel to the support elements at alternate ends of the portions extending substantially parallel to the support elements.

In the preferred embodiment, the portions of the heating element extending substantially parallel to the support elements have a maximum cross section which is greater than the maximum cross section of other portions of the heating element. Preferably, the portions extending substantially perpendicular to the support elements have a substantially semicircular shape. Also preferably, the heating element includes portions extending diagonally in one direction between one support element and another support element and portions extending diagonally in a different direction from the first direction between one support element and another support element. Moreover, the portions extending diagonally in one direction are connected to the portions extending diagonally in the other direction by curved portions.

Also in the preferred embodiment, the at least one electric heater further includes at least one reinforcing portion adjacent at least one of the support elements. Preferably, the heating element includes a first portion of heating element and a second portion of heating element and the at least one electric heater further includes at least one reinforcing portion between the first portion of heating element and the second portion of heating element. Also preferably, the electric heater includes at least one reinforcing strut extending substantially perpendicular to at least one of the support elements.

In another embodiment, a heater includes a heating element of a first cross section electrically connected to a plurality of elongate support elements, each support element having a cross section greater than the first cross section. Preferably, the at least one of the support elements is integrally formed with the heating element.

BRIEF DESCRIPTION OF THE DRAWINGS

The invention will be further described, by way of example only, with reference to the accompanying drawings wherein like reference numerals are applied to like elements and wherein.

DETAILED DESCRIPTION

Figure 1:
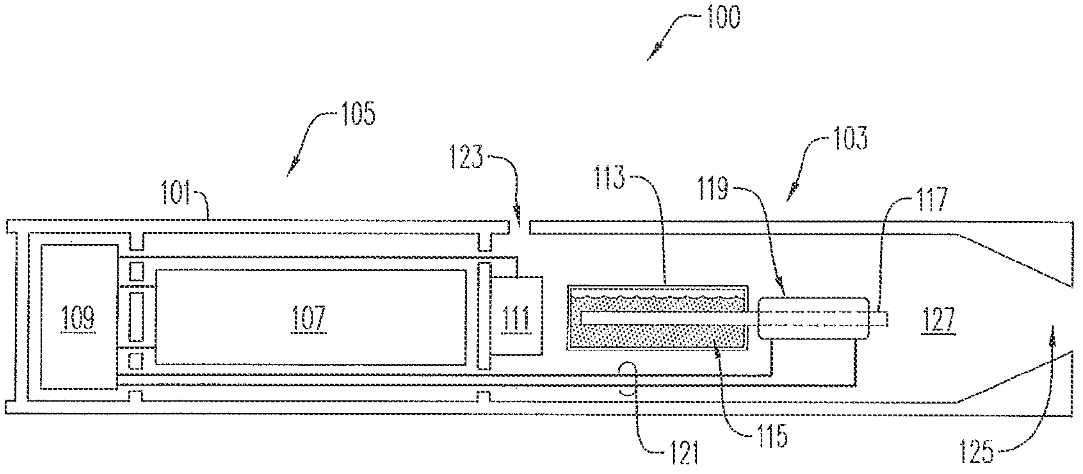
FIG. 1 shows one example of an aerosol generating system which is a smoking system having a liquid storage portion.

In a preferred embodiment, an electrically heated aerosol generating system for receiving an aerosol-forming substrate, the system including at least one electric heater for heating the aerosol-forming substrate to form the aerosol, the heater including a heating element of a first cross section electrically connected to a plurality of elongate support elements, each support element having a cross section greater than the first cross section and wherein at least one of the support elements is integrally formed with the heating element.

Providing an integrally formed heater in an electrically heated aerosol generating system simplifies manufacture of the heater and heating element. Further, providing a heater with integral heating element and support element or elements simplifies assembly of the aerosol generating system since the heater may be readily folded, and the support elements slotted into slots in a housing of the smoking system to retain the heater in position.

Having support elements which have a greater cross section than that of the heating element has the advantage that the support elements heat up less than the heating element portion of the heater. This reduces the amount of energy required to power the heater. The greater cross section support elements are also more rigid than the heating element, and therefore the support elements provide good structural support for the heating element. Providing support elements having a greater cross section than that of the heating elements may be achieved by cutting the heater from a sheet of material which is thicker in the region from which the electrical support elements are formed, but thinner in the region from which the heating element is formed. This means the heating element portion has a higher resistance than the support elements. In addition, the support elements are more rigid than the heating element. The sheet material of variable thickness may be produced by a chemical attack process. Producing the heater from sheet material simplifies manufacture.

Preferably, the aerosol generating system is a smoking system.

In the preferred embodiment of the electrically heated aerosol generating system, the aerosol-forming substrate is a liquid aerosol-forming substrate. Preferably, the electrically heated aerosol generating system further includes a liquid storage portion. Also preferably, the liquid aerosol-forming substrate is stored in the liquid storage portion. In the preferred embodiment, the electrically heated aerosol generating system further includes a capillary wick in communication with the liquid storage portion. It is also possible for a capillary wick for holding liquid to be provided without a liquid storage portion. In that embodiment, the capillary wick may be preloaded with liquid.

Preferably, the capillary wick is arranged to be in contact with liquid in the liquid storage portion. In that case, in use, liquid is transferred from the liquid storage portion towards the heater by capillary action in the capillary wick. In the preferred embodiment, the capillary wick has a first end and a second end, the first end extending into the liquid storage portion for contact with liquid therein and the at least one electric heater being arranged to heat liquid in the second end. When the heater is activated, the liquid at the second end of the capillary wick is vaporized by the heater to form the supersaturated vapor.

An advantage of providing a liquid storage portion is that the liquid in the liquid storage portion is protected from oxygen (because oxygen cannot generally enter the liquid storage portion via the capillary wick) and, in some embodiments light, so that the risk of degradation of the liquid is significantly reduced. Therefore, a high level of hygiene can be maintained. Using a capillary wick extending between the liquid and the heater, allows the structure of the system to be relatively simple. The liquid has physical properties, including viscosity, which allow the liquid to be transported through the capillary wick by capillary action. The liquid storage portion is preferably a container. Preferably, the container is opaque, thereby limiting degradation of the liquid by light. The liquid storage portion may not be refillable. Thus, when the liquid in the liquid storage portion has been used up, the smoking system is replaced. Alternatively, the liquid storage portion may be refillable. In that case, the aerosol generating system may be replaced after a certain number of refills of the liquid storage portion. Preferably, the liquid storage portion is arranged to hold liquid for a pre-determined number of puffs.

The capillary wick may have a fibrous or spongy structure. For example, the capillary wick may include a plurality of fibers or threads. The fibers or threads may be generally aligned in the longitudinal direction of the aerosol generating system. Alternatively, the capillary wick may include sponge-like or foam-like material formed into a rod shape. The rod shape may extend along the longitudinal direction of the aerosol generating system. The structure of the wick forms a plurality of small bores or tubes, through which the liquid can be transported to the heater, by capillary action. The capillary wick may include any suitable material or combination of materials. Examples of suitable materials are ceramic- or graphite-based materials in the form of fibers or sintered powders. The capillary wick may have any suitable capillarity and porosity so as to be used with different liquid physical properties such as density, viscosity, surface tension and vapor pressure. The capillary properties of the wick, combined with the properties of the liquid, ensure that the wick is always wet in the heating area. If the wick is dry, there may be overheating, which can lead to thermal degradation of liquid.

The electrically heated aerosol generating system may include at least one air inlet. The electrically heated aerosol generating system may include at least one air outlet. The electrically heated aerosol generating system may include an aerosol-forming chamber between the air inlet and air outlet. In use, when the heater is activated, the liquid in the capillary wick is vaporized by the heater to form a supersaturated vapor. The supersaturated vapor is mixed with and carried in the air flow from the at least one air inlet. During the flow, the vapor condenses to form an aerosol in the aerosol-forming chamber, and the aerosol is carried towards the air outlet into the mouth of a user.

The liquid has physical properties, for example a boiling point suitable for use in the smoking system: if the boiling point is too high, the at least one heater will not be able to vaporize liquid in the capillary wick, but, if the boiling point is too low, the liquid may vaporize even without the at least one heater being activated. The liquid preferably includes a tobacco-containing material including volatile tobacco flavor compounds which are released from the liquid upon heating. Alternatively, or in addition, the liquid may include a non-tobacco material. The liquid may include water, solvents, ethanol, plant extracts and natural or artificial flavors. Preferably, the liquid further includes an aerosol former. Examples of suitable aerosol formers are glycerine and propylene glycol.

Alternatively, the aerosol-forming substrate may be a solid aerosol-forming substrate. The aerosol-forming substrate includes a tobacco-containing material containing volatile tobacco flavor compounds which are released from the substrate upon heating. The aerosol-forming substrate may include a non-tobacco material. The aerosol-forming substrate may include tobacco-containing material and non-tobacco containing material. Preferably, the aerosol-forming substrate further includes an aerosol former. Examples of suitable aerosol formers are glycerine and propylene glycol.

The solid substrate may include, for example, one or more of: powder, granules, pellets, shreds, spaghettis, strips or sheets containing one or more of: herb leaf, tobacco leaf, fragments of tobacco ribs, reconstituted tobacco, extruded tobacco such as homogenized tobacco and expanded tobacco. The solid substrate may be in loose form, or may be provided in a suitable container or cartridge. Optionally, the solid substrate may contain additional tobacco or non-tobacco volatile flavor compounds, to be released upon heating of the substrate.

Optionally, the solid substrate may be provided on or embedded in a thermally stable carrier. In a preferred embodiment, the carrier is a tubular carrier having a thin layer of the solid substrate deposited on its inner surface, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix.

Alternatively, the carrier may take the form of powder, granules, pellets, shreds, spaghettis, strips or sheets. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavor delivery during use. Alternatively, the carrier may be a non-woven fabric or fiber bundle into which tobacco components have been incorporated. The non-woven fabric or fiber bundle may include, for example, carbon fibers, natural cellulose fibers, or cellulose derivative fibers.

Further, an aerosol is a suspension of solid particles or liquid droplets in a gas, such as air. The aerosol may be a suspension of solid particles and liquid droplets in a gas, such as air.

In the preferred embodiment, each of the support elements includes an electrically positive connector or an electrically negative connector. Preferably, the support elements are less flexible than the heating element. In the preferred embodiment, the support elements are substantially rigid. The support elements may have any suitable shape. In one preferred embodiment, the support elements are elongate. The support elements may be elongate blades, pins or rods. The support elements may have a substantially constant width along their length.

The heating element may be made from an elastic material. That is to say, preferably, the heating element is elastic. The heating element may have any suitable elasticity. This may ensure good contact of the heating element and the aerosol-forming substrate. The heating element may be made from a flexible material. That is to say, preferably, the heating element is flexible. The heating element may have any suitable flexibility. The heating element may have a substantially constant width along its length.

The heating element may include a flexible heating element extending between the support elements. The heating element may include a sheet of electrically resistive material. The sheet may have any suitable shape, as will be described further below. The heating element may be formed by shaping from a sheet of electrically resistive material. For example, the heating element may be cut from the sheet of electrically resistive material, for example, by a laser or by a chemical or electrical processor by high pressure water jet. Alternatively, the heating element may be pre-formed in the desired shape.

In the preferred embodiment in which the heater is an electric heater for an electrically heated smoking system having a capillary wick for holding liquid, preferably, in use, the support elements are secured adjacent the capillary wick and the heating element extends between the support elements and around the capillary wick. The support elements may be secured adjacent one another. If the support elements are elongate, they are preferably arranged to extend parallel to the longitudinal axis of the capillary wick when secured.

As already described, the heating element may be flexible. The sheet of material may have any suitable flexibility. Preferably, the sheet of material is elastic. That elasticity results in a spring effect when the heating element is assembled around the capillary wick. This ensures good contact with the capillary wick. This ensures a consistent and repeatable smoking experience. The heating element may extend partially or fully along the capillary wick. The heating element preferably extends around substantially the entire circumference of the capillary wick.

The at least one electric heater may include a single heating element. Alternatively, the at least one heater may include more than one heating element, for example two, or three, or four, or five, or six or more heating elements. In that case, each heating element may extend between one support element which may an electrically positive connector and another support element which may be an electrically negative connector. The heating element or heating elements may be arranged appropriately so as to most effectively heat the aerosol-forming substrate. In the embodiment in which a capillary wick is provided, the heating element or heating elements may be arranged appropriately so as to most effectively vaporize liquid in the capillary wick.

Suitable electrically resistive materials for the heating element include but are not limited to: semiconductors such as doped ceramics, electrically conductive ceramics (such as, for example, molybdenum disilicide), carbon, graphite, metals, metal alloys and composite materials made of a ceramic material and a metallic material. Such composite materials may include doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation, 1999 Broadway Suite 4300, Denver Colo.

In composite materials, the electrically resistive material may optionally be embedded in, encapsulated or coated with an insulating material or vice-versa, depending on the kinetics of energy transfer and the external physicochemical properties required. The heating element may include a metallic etched foil insulated between two layers of an inert material. In that case, the inert material may include Kapton®, all-polyimide or mica foil. Kapton® is a registered trade mark of E.I. du Pont de Nemours and Company, 1007 Market Street, Wilmington, Delaware 19898, United States of America.

The at least one heater may additionally include a disk (end) heater or a combination of a disk heater with heating needles or rods.

In the preferred embodiment, the heating element has the shape of a square wave extending between the support elements. That is to say, the heating element may include portions extending substantially parallel to the support elements and portions extending substantially perpendicular to the support elements joining the portions extending substantially parallel to the support elements at alternate ends of the portions extending substantially parallel to the support elements. In another embodiment, the support elements are elongate and the heating element includes portions extending substantially parallel to the longitudinal axis of the elongate support elements and portions extending substantially perpendicular to the longitudinal axis of the elongate support elements joining the portions extending substantially parallel to the longitudinal axis of the elongate support elements at alternate ends of the portions extending substantially parallel to the longitudinal axis of the elongate support elements.

The number and size of the portions extending substantially parallel to the support elements may be varied. The number and size of the portions extending substantially perpendicular to the support elements may be varied. This will affect the ultimate flexibility of the heating element.

All portions of the heating element may have the same cross sectional shape and area. Alternatively, some portions of the heating element may have a different cross sectional shape from other portions of the heating element.

In the preferred embodiment, the portions of the heating element extending substantially parallel to the support elements have a maximum cross section which is greater than the maximum cross section of other portions of the heating element. That is to say, the portions extending substantially parallel to the support elements are thicker, at least in part, relative to other portions. The portions extending substantially parallel to the connectors may not have a constant cross section. In fact, in a preferred embodiment, the portions extending substantially parallel to the connectors are lens-shaped, having a central cross section greater than the end cross sections.

In another preferred embodiment, the portions extending substantially perpendicular to the support elements have a substantially semicircular shape. That is to say, the portions extending substantially perpendicular to the support elements are thicker relative to other portions and formed as a semicircle. Preferably, the curved edge of each semicircle is directed away from the portions of the heating element extending substantially parallel to the support elements.

A heating element having a constant cross section along its length, hot spots may be formed in the middle or at the ends of the heating element. This may result in overheating at certain spots. Providing a portion or portions of the heating element having a greater cross sectional area reduces the resistance of those portions, thereby reducing the Joule heating. This may reduce the likelihood of hot spots forming and may provide a more uniform heat distribution.

In the preferred embodiment, the heating element includes portions extending diagonally in one direction between one support element and another support element and portions extending diagonally in a different direction from the first direction between one support element and another support element. Preferably, the support elements are elongate and the heating element includes portions extending diagonally in one direction between one elongate support element and another elongate support element and portions extending diagonally in a different direction from the first direction between one elongate support element and another elongate support element. In that case, the heating element may have the shape of a substantially triangular wave extending between the connectors.

The portions extending diagonally in one direction may be connected to the portions extending diagonally in the other direction by curved portions. In that case, the heating element may have the shape of a substantially sinusoidal wave extending between the connectors.

It has been found that including portions extending diagonally relative to the support elements, rather than extending substantially parallel or perpendicular relative to the support elements, assists with assembling the heating element. In particular, if the electrically heated aerosol generating system includes a capillary wick, this assists with assembling the heating element around the capillary wick. In some embodiments, improved contact between the heating element and the capillary wick can be established. If the portions extending diagonally in one direction are connected to the portions extending diagonally in the opposite direction by curved portions, this may further improve the flexibility.

The number, size and angle of the portions extending diagonally in one direction may be varied. The number, size and angle of the portions extending diagonally in the other direction may be varied. The curvature of the curved portions may be adjusted. This will affect the ultimate flexibility of the heating element.

All portions of the heating element may have the same cross sectional shape and area. Alternatively, some portions of the heating element may have a different cross sectional shape from other portions of the heating element. As already described, this may improve heat distribution.

Various shapes for the heating element have been disclosed, but the skilled person will appreciate that any suitable shape may be used. In addition, the heating element need not have the same shape extending all the way between the support elements. For example, the heating element may include a first section of heating element having a first shape and a second section of heating element having a second shape. Or, further sections may be included. As already discussed, the shape and other characteristics of the heating element affect the aerosol formation and the smoking experience.

Preferably, the at least one electric heater further includes at least one reinforcing portion adjacent at least one of the support elements. The at least one reinforcing portion may include material which is less flexible than the heating element. This provides strength to the heating element. The at least one reinforcing portion may be integrally formed with the heating element. The reinforcing portion may also facilitate a folding operation, which is important for thin heating elements. It may also enable the heater to have more of a spring effect, and may therefore enable the heater, in particular the heating element, to remain close to the aerosol-forming substrate.

The reinforcing portion may or may not include an electrically conducting material, as long as a path for electric current may still be established between an electrically positive connector and an electrically negative connector, via the heating element. The cross section of the reinforcing portion may be larger than the cross section of the heating element to reduce heating in the reinforcing portion. The reinforcing portion may include a strut of material connected to the support element. In one embodiment, the at least one reinforcing portion includes a reinforcing portion adjacent an electrically positive support element. In one embodiment, the at least one reinforcing portion includes a reinforcing portion adjacent an electrically negative support element. In one embodiment, the at least one reinforcing portion includes one or more reinforcing portions adjacent a electrically positive support element and one or more reinforcing portions adjacent an electrically negative support element.

Preferably, the heating element includes a first portion of heating element and a second portion of heating element and the at least one electric heater further includes at least one reinforcing portion between the first portion of heating element and the second portion of heating element. Preferably, the reinforcing portion between the two heating element portions is not adjacent either support element. The reinforcing portion may be located at any appropriate position and the two heating element portions need not be of equal size. The at least one reinforcing portion between the first portion of heating element and the second portion of heating element may include material which is less flexible than the heating element. This provides strength to the heating element. The at least one reinforcing portion may be integrally formed with the heating element. The reinforcing portion may or may not include an electrically conducting material, as long as a path for electric current may still be established through the heating element. The reinforcing portion may include a strut of material connected to the heating element portions. In one embodiment in which a capillary wick is provided, the at least one reinforcing portion includes a reinforcing portion which is substantially opposite the support elements when the heater is assembled around the capillary wick Preferably, the at least one electric heater further includes at least one reinforcing strut extending substantially perpendicular to at least one of the support elements. The reinforcing strut may be at one end of the heating element. In one embodiment, the at least one reinforcing strut is connected to an electrically negative connector. The at least one reinforcing strut may include the same material as the electrically negative connector. That material may be more rigid than the material of the heating element. In one embodiment, the at least one reinforcing strut is connected to an electrically positive connector. The at least one reinforcing strut may include the same material as the electrically positive connector. That material may be more rigid than the material of the heating element.

In the preferred embodiment, the at least one reinforcing strut includes a reinforcing strut extending from the electrically negative connector in a direction substantially perpendicular to the electrically negative connector. In one embodiment, the at least one reinforcing strut includes a reinforcing strut extending from the electrically positive connector in a direction substantially perpendicular to the electrically positive connector. If a capillary wick is provided, preferably, the reinforcing strut extends at least partially around the capillary wick. The reinforcing strut may extend around substantially the entire circumference of the capillary wick. If a liquid storage portion is used, when the heating element is around the capillary wick, the reinforcing strut may be closer to the liquid storage portion than the heating element. Alternatively, the reinforcing strut may be further from the liquid storage portion than the heating element.

At least one of the reinforcing strut or struts may be secured to the electrically heated aerosol generating system. This will provide additional structural support. For example, if a liquid storage portion is provided, the reinforcing strut or struts may be secured in a groove in the liquid storage portion.

The smoking system may further include an electric power supply. Preferably, the electric power supply includes a cell contained in a housing. The electric power supply may be a lithium-ion battery or one of its variants, for example a lithium-ion polymer battery. Alternatively, the power supply may be a nickel-metal hydride battery, a Nickel cadmium battery, lithium-manganese battery, a lithium-cobalt battery or a fuel cell. In that case, preferably, the electrically heated smoking system is usable by a smoker until the energy in the power cell is used up.

Alternatively, the electric power supply may include circuitry chargeable by an external charging portion. In that case, preferably the circuitry, when charged, provides power for a pre-determined number of puffs, after which the circuitry must be re-connected to the external charging portion. An example of suitable circuitry is one or more capacitors or rechargeable batteries.

The smoking system may further include electric circuitry. In the preferred embodiment, the electric circuitry includes a sensor to detect air flow indicative of a user taking a puff. The sensor may be an electro-mechanical device. Alternatively, the sensor may be any of: a mechanical device, an optical device, an opto-mechanical device, a micro electro mechanical systems (MEMS) based sensor and an acoustic sensor. In that case, preferably, the electric circuitry is arranged to provide an electric current pulse to the at least one heater when the sensor senses a user taking a puff. Preferably, the time-period of the electric current pulse is pre-set, depending on the amount of liquid desired to be vaporized. The electric circuitry is preferably programmable for this purpose. Alternatively, the electric circuitry may include a manually operable switch for a user to initiate a puff. The time-period of the electric current pulse is preferably pre-set depending on the amount of liquid desired to be vaporized. The electric circuitry is preferably programmable for this purpose.

In the preferred embodiment, the electrically heated aerosol generating system includes at least one air inlet. There may be one, two, three, four, five or more air inlets. Preferably, if there is more than one air inlet, the air inlets are spaced around the electrically heated aerosol generating system. In the preferred embodiment, the electric circuitry includes a sensor to detect air flow indicative of a user taking a puff, and the at least one air inlet is upstream of the sensor.

Preferably, the aerosol generating system further includes an indicator for indicating when the at least one heater is activated. In the embodiment in which the electric circuitry includes a sensor to detect air flow indicative of a user taking a puff, the indicator may be activated when the sensor senses air flow indicative of the user taking a puff. In the embodiment in which the electric circuitry includes a manually operable switch, the indicator may be activated by the switch.

The electrically heated aerosol generating system may further include an atomizer including the at least one heater. In addition to a heating element, the atomizer may include one or more electromechanical elements such as piezoelectric elements. Additionally or alternatively, the atomizer may also include elements that use electrostatic, electromagnetic or pneumatic effects.

Preferably, the aerosol generating system includes a housing. Preferably, the housing is elongate. If the aerosol generating includes a capillary wick, the longitudinal axis of the capillary wick and the longitudinal axis of the housing may be substantially parallel. The housing may include a shell and a mouthpiece. In that case, all the components may be contained in either the shell or the mouthpiece. Preferably, the electric power supply and the electric circuitry are contained in the shell. Preferably, the liquid storage portion, if included, the capillary wick, if included, the heater and the air outlet are contained in the mouthpiece. The at least one air inlet, if included, may be provided in either the shell or the mouthpiece. In the preferred embodiment, the housing includes a removable insert including the liquid storage portion, the capillary wick and the heater. In that embodiment, those parts of the aerosol generating system may be removable from the housing as a single component. This may be useful for refilling or replacing the liquid storage portion, for example.

Preferably, the mouthpiece is replaceable. Having a shell and a separate mouthpiece provides a number of advantages. Firstly, if the replaceable mouthpiece contains the heater, the liquid storage portion and the wick, all elements which are potentially in contact with the liquid are changed when the mouthpiece is replaced. There will be no cross-contamination in the shell between different mouthpieces, for example ones using different liquids. Also, if the mouthpiece is replaced at suitable intervals, there is little chance of the heater becoming clogged with liquid. Preferably, the shell and mouthpiece are arranged to releasably lock together when engaged.

The housing may include any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol generating system is portable. The aerosol generating system may be a smoking system and may have a size comparable to a conventional cigar or cigarette. The smoking system may have a total length ranging from about 30 mm to about 100 mm. The smoking system may have an external diameter ranging from about 5 mm to about 13 mm. When the heating element is folded around an aerosol-forming substrate, this may have a diameter ranging from about 3 mm to about 5 mm. The heating element may have a cross section ranging from about 0.5 mm to about 1 mm. The heating element may have a thickness ranging from about 0.1 mm to about 0.3 mm.

According to another embodiment, there is provided a heater including a heating element of a first cross section electrically connected to a plurality of elongate support elements, each support element having a cross section greater than the first cross section and wherein at least one of the support elements is integrally formed with the heating element.

Preferably, the heating element heats up when electrical current is passed through it. The heater may be for an electrically heated smoking system. The heater may be an electric heater for an electrically heated smoking system having a capillary wick for holding liquid. The heater may be arranged to heat liquid in at least a portion of the capillary wick to form the aerosol.

In yet another embodiment, there is also provided use of a heater according to the second aspect of the present invention as a heater to heat an aerosol-forming substrate in an electrically heated aerosol generating system.

The smoking system and heater according to the present invention provide a number of advantages. The heater is cheap and easy to manufacture. In particular, the heater is considerably simpler and easier to manufacture than prior art heaters which include a coil of wire arranged to surround a capillary wick. No welding or gluing of components may be required. The heater is robust. In addition, because the heating element may be manufactured from a sheet of electrically resistive material, the heating element can be manufactured very accurately. This is advantageous because even small changes in the heater structure (for example, the positioning and tensioning of the heater around the capillary wick) affects the aerosol formation, in particular the particle size in the aerosol. This affects the smoking experience. Accurate production ensures a consistent and repeatable smoking experience. In addition, it has generally been found that reduction of the size of the aerosol-forming chamber improves the smoking experience by improving the process of aerosol formation. However, a smaller aerosol-forming chamber reduces tolerances on the size of the heater. The heater of the present invention can be produced very accurately, thereby solving this tolerance problem.

Features described in relation to one embodiment of the present invention may also be applicable to another embodiment of the present invention.

FIG. 1 shows one example of an aerosol generating system. In FIG. 1, the system is a smoking system having a liquid storage portion. The smoking system 100 of FIG. 1 is an electrically heated smoking system and includes a housing 101 having a mouthpiece end 103 and a body end 105. In the body end, there is provided an electric power supply in the form of battery 107 and electric circuitry in the form of circuitry 109 and a puff detection system 111. In the mouthpiece end, there is provided a liquid storage portion in the form of cartridge 113 containing liquid 115, a capillary wick 117 and a heater 119. Note that the heater is only shown schematically in FIG. 1, One end of the capillary wick 117 extends into the cartridge 113 and the other end of the capillary wick 117 is surrounded by the heater 119. The heater is connected to the electric circuitry via connections 121. The housing 101 also includes an air inlet 123, an air outlet 125 at the mouthpiece end and an aerosol-forming chamber 127.

In use, operation is as follows. Liquid 115 is transferred or conveyed by capillary action from the cartridge 113 from the end of the wick 117 which extends into the cartridge to the other end of the wick 117 which is surrounded by the heater 119. When a user draws on the device at the air outlet 125, ambient air is drawn through air inlet 123. In the arrangement shown in FIG. 1, the puff detection system 111 senses the puff and activates the heater 119. The battery 107 supplies a pulse of energy to the heater 119 to heat the end of the wick 117 surrounded by the heater. The liquid in that end of the wick 117 is vaporized by the heater 119 to create a supersaturated vapor. At the same time, the liquid being vaporized is replaced by further liquid moving along the wick 117 by capillary action. (This is sometimes referred to as "pumping action".) The supersaturated vapor created is mixed with and carried in the air flow from the air inlet 123. In the aerosol-forming chamber 127, the vapor condenses to form an inhalable aerosol, which is carried towards the outlet 125 and into the mouth of the user.

In the embodiment shown in FIG. 1, the circuitry 109 and the puff detection system 111 are preferably programmable. The circuitry 109 and puff detection system 111 can be used to manage the device operation. This, in conjunction with the physical design of the electrically heated smoking system, in particular the electric heating element, can assist with control of the particle size in the aerosol.

The capillary wick can be made from a variety of porous or capillary materials and preferably has a known, pre-defined capillarity. Examples include ceramic- or graphite-based materials in the form of fibers or sintered powders. Wicks of different porosities can be used to accommodate different liquid physical properties such as density, viscosity, surface tension and vapor pressure. The wick must be suitable so that the required amount of liquid can be delivered to the heating element.

FIG. 1 shows one example of an aerosol generating system which may be used with the present invention. Many other examples are usable with the invention, however. For example, the system need not be a smoking system. For example, additional air inlets may be provided, for example, spaced circumferentially around the housing. For example, a puff detection system need not be provided. Instead, the system could operate by manual operation, for example, the user operating a switch when a puff is taken. For example, the housing could include a separable shell and mouthpiece. For example, the overall shape and size of the housing could be altered. For example, a different type of substrate, such as a solid substrate, might be provided. For example, the liquid cartridge may be omitted and the capillary wick could simply be pre-loaded with liquid before use. Other variations are, of course, possible.

A number of embodiments of the invention will now be described, based on the example shown in FIG. 1. Components shown in FIG. 1 are not indicated again, in order to simplify the drawings. In addition, the puff detection system 111 and connections 121 are not shown, again for simplicity. Note that all the drawings are schematic in nature. In particular, the components shown are not to scale either individually or relative to one another.

Figure 2:
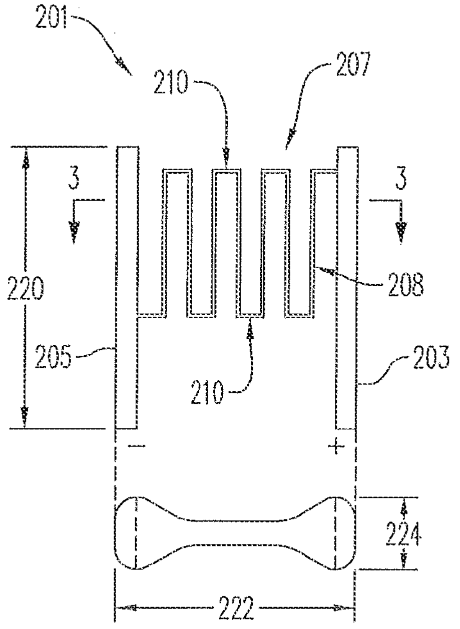
FIG. 2 shows a first embodiment of a heater.

FIG. 2 shows a first embodiment of a heater. In the embodiment of FIG. 2, the heater 201 includes an electrically positive support element 203 and an electrically negative support element 205. The support elements may also be referred to as connector blades. Heating element 207 extends between the connector blades 203, 205. One or more of the blades is integrally formed with the heating element. As used herein, the term "integrally formed" refers to both the blade and the heating element being made out of a single piece of material.

In the embodiment of FIG. 2, the heating element 207 includes one or more elongate longitudinal portions 208 (that is to say, portions which extend substantially along, or substantially parallel to, the elongate axis of the heater). The longitudinal portions 208 may be substantially parallel to the elongate support elements 203, 205. The longitudinal portion or portions 208 of the heating element are joined by alternate transverse portions 210 of the heating element arranged at extremities of the longitudinal portion or portions of the heating element. The transverse portions 210 may connect to further longitudinal portions 208 of the heating element. One transverse portion connects one longitudinal portion to one of the connector blades 203, 205. Another transverse portion also connects one longitudinal portion to the other of the connector blades 205, 203. The transverse portions may extend substantially perpendicular to the connector blades 203, 205. The transverse portions may extend substantially perpendicular to the longitudinal portions. The resulting structure has the shape of a square wave.

The lower part of FIG. 2 shows a cross section along line 3-3. As can be seen from the lower part of FIG. 2, in this embodiment, the connector blades or support elements 203, 205 are formed together with the heating element 207 from a single piece of material. That is to say, the connector blades or support elements 203, 205 and the heating element 207 are integrally formed. The piece of material has a greater thickness in the region of the connector blades 203, 205 than in the region of the heating element 207.

In FIG. 2, the length or height direction of the heater is shown at 220, the width direction of the heater is shown at 222 and the thickness direction is shown at 224. The cross sectional area of the heating element or support elements is measured perpendicular to the direction in which it is extending. That is to say, for the support elements, the cross section is measured perpendicular to direction 220, for portions 208, the cross section is measured perpendicular to direction 220 and for portions 210, the cross section is measured perpendicular to direction 222.

The longitudinal and transverse portions may be electrically joined to each other so that an electric current can flow when a potential difference is applied across the heating element. Further the longitudinal portions and transverse portions may also be electrically connected to the connector blades or support elements. Then an electrical current may flow in the heater when a potential difference is applied across the connector blades. The longitudinal portion or portions of the heating element may be longer than the transverse portions of the heating element (as shown). Alternatively, the longitudinal portion or portions of the heating element may be shorter than the transverse portions.

In the preferred embodiment, the system can include a heating element with a square wave structure in which the height of the square wave structure is greater than the distance between adjacent peaks or troughs of the square wave structure. In the drawings, the height of the square wave structure is about 5.5 times the distance between adjacent peaks or troughs. That is to say that the longitudinal portion or portions of the heating element have a length which is about 5.5 times the length of the transverse portions. This allows more of the heater to be in contact with the capillary wick and therefore leads to improved heating. Alternatively, the heating element may have a square wave structure in which the height of the square wave structure is equal to or less than the distance between adjacent peaks or troughs of the square wave structure.

Figure 3:
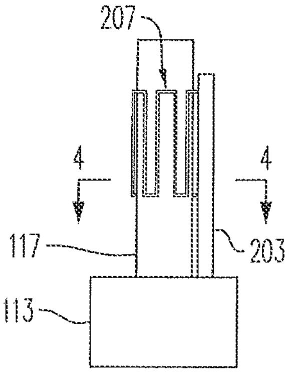
FIG. 3 shows the heater of FIG. 2 in position around a capillary wick.
Figure 4:
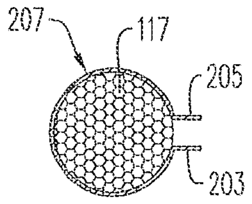
FIG. 4 is a cross section along line 4-4 of FIG. 3.

FIG. 3 shows the heater 201 of FIG. 2 assembled around a capillary wick 117. FIG. 4 is a cross section along line 4-4 of FIG. 3. FIG. 3 shows only the capillary wick 117 and heater, plus the top portion of the liquid cartridge 113. The remaining components of the smoking system are not shown. That is to say, FIG. 3 shows an enlarged view of box A in FIG. 1.

As can be seen in FIGS. 3 and 4, the connector blades 203, 205 are secured to the liquid cartridge 113, although they could be secured to another part of the device. In this embodiment, the connector blades are elongate and the longitudinal axis of each connector blade extends substantially parallel to the longitudinal axis of the elongate capillary wick. In this embodiment, the connector blades are secured adjacent to one another. In this embodiment, the connector blades are secured on the same side of the capillary wick. In this embodiment, the connector blades are connected to the electrical circuitry (not shown) via connections (also not shown).

In this embodiment, heating element 207 extends substantially all the way around the capillary wick 117. In this embodiment, the heating element extends along only part of the length of the exposed portion of capillary wick. Because the elongate connector blades are relatively rigid, in comparison to the relatively flexible heating element, when the connector blades are secured to the top of the liquid cartridge, the heating element is caused to bend around the capillary wick.

In an alternative embodiment, not shown in the drawings, the heating element may be rotated by about 90° relative to the blades or support elements. That is to say, that the longitudinal portions 208 may be substantially perpendicular to the elongate connector blades 203, 205. In that embodiment, the transverse portions may be substantially parallel to the connector blades 203, 205. The transverse portions may still be substantially perpendicular to the longitudinal portions. This can also apply to other embodiments.

This arrangement has the advantage that the total length of the heating element in contact with the capillary wick is the same as in the embodiment shown in FIGS. 2, 3 and 4, but, when the heater is bent around or folded around the capillary wick, more of the heating element is curved or bent than in the embodiment shown in FIGS. 2, 3 and 4. This is because the elongate longitudinal portions of the heating element are curved around the capillary wick. Therefore the heater of this embodiment may be more robust, and less likely to collapse or be deformed when assembled around the capillary wick.

The heating element in FIG. 2 includes an electrically resistive material. The heating element includes a sheet of the material, preferably metal, shaped as desired, then rolled around the capillary wick. The metal sheet may be cut by any suitable laser, chemical or electrical process. Once cut, the metal sheet can be rolled or folded around the capillary wick. The metal sheet can be cut into any appropriate shape and, as will be discussed below, may include portions having different cross sectional shapes and areas to assist with heat distribution. The heat distribution affects formation of the aerosol, in particular the size of the aerosol particles. This affects the smoking experience.

Producing the heating element by cutting from a sheet of material, rather than, for example as a coil, can simplify manufacture. In addition, it allows the shape of the heater to be more accurately defined, which can improve the consistency of the aerosol. In addition, the heating element may be more robust. The heat distribution can also be improved and the contact between the heating element and the capillary wick can be improved.

A number of variations in the heater are possible. The shape, height and thickness of the connector blades may be varied. In addition, the cross sectional area and shape of the heating element may be varied and this will be discussed below. The height of the heating element as compared with the length of the exposed portion of the capillary wick and the height of the connector blades can be varied. The heating element may include any suitable electrically resistive material. The material may have a variety of thicknesses.

Further the heater may have connector blades which have a different thickness from the thickness of the heating element. As already discussed, this is shown in the lower part of FIG. 2. In this embodiment, the blades or support elements and the heating element are formed from a material which is thicker in the blades part of the heater than in the heating element part of heater. This has the advantage that the blades or support elements are even more rigid.

As shown in the lower part of FIG. 2, the cross section of the material from which the heater is made is substantially dog-bone shaped. Other shapes are possible. The blades may be twice as thick as the central portion of the heating element. Such a heater may be produced by chemical attack. In this case, a sheet of material, such as metal, of about constant thickness can be attacked or etched with chemicals in order to produce a sheet of material or heater with variable thickness. The material may have a variety of Young's modulus, that is to say, elasticity. These properties of the material will affect its assembly and the resulting structure.

Assembly of the heater around the capillary wick is discussed below in relation to FIGS. 17, 18 and 19.

Figure 5:
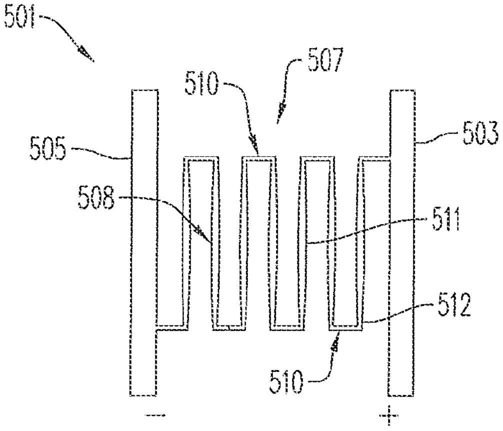
FIG. 5 shows a second embodiment of a heater.

FIG. 5 shows a second embodiment of a heater. In the embodiment of FIG. 5, the heater 501 includes an electrically positive connector blade 503 and an electrically negative connector blade 505. Heating element 507 extends between the blades 503, 505. In the embodiment of FIG. 5, the heating element 507 includes portions 508 of longitudinally extending heating element (that is to say, portions which extend substantially parallel to the connector blades 503, 505 or the longitudinal axis of the heater), joined by alternate transverse portions 510 positioned at each end of the longitudinal heating elements (that is to say, portions which extend substantially perpendicular to the connector blades 503, 505 or the longitudinal axis of the system). Similar to the embodiment of FIG. 2, the resulting structure has the shape of a square wave. The particular shape of the square wave, including its orientation, and its height relative to the distance between adjacent peaks and troughs, may be varied as described in relation to FIG. 2.

However, in the embodiment of FIG. 5, the portions 508 of longitudinally extending heating element are wider so that those portions have a greater cross sectional area, at least in some places, than other portions of the heating element. The portions 508 of longitudinally extending heating element have two convex sides forming a lens-shape. That is to say, the longitudinal portions 508 of the heating element are wider in the middle, than at each end of the longitudinal portions of the heating element.

The shape variation affects the resistive heating produced by the heating element and hence the heat distribution around the capillary wick. In particular, the Joule effect means that, for a given electric current, the heat produced is proportional to the resistance. The resistance, of course, depends on the shape of the resistor, including its cross sectional area. This means that the cross sectional shape of the heating element can be used to control the heat distribution.

In particular, in a heating element having a constant cross section along its length, hot spots may be formed in the middle or at the ends of the heating element. This may result in overheating of the capillary wick at certain spots. Providing a portion or portions of the heating element having a greater cross sectional area reduces the resistance of those portions, thereby reducing the Joule heating. This reduces the likelihood of hot spots forming and provides a more uniform heat distribution.

In the preferred embodiment, the largest cross sectional area of the heating element may be about twice the smallest cross sectional area of the heating element. That is to say, the middle portion 511 of the longitudinally extending portions 508 of the heating element is about twice as wide as the end portion 512 of the longitudinally extending portions 508 of the heating element.

As in the previous embodiment, at least one of the blades is integrally formed with the heating element. That is to say, both the blade and the heating element may be made from a single piece of material.

The heater of FIG. 5 is assembled around a capillary wick in the same way as shown in FIGS. 3 and 4. Features of that assembly are described in relation to FIGS. 3 and 4 and will not be repeated. The heating element in FIG. 5 includes an electrically resistive material and the various properties of the heater and heating element are described in relation to FIGS. 2, 3 and 4 and will not be repeated. Assembly of the heater around the capillary wick is discussed below in relation to FIGS. 17, 18 and 19.

Figure 6:
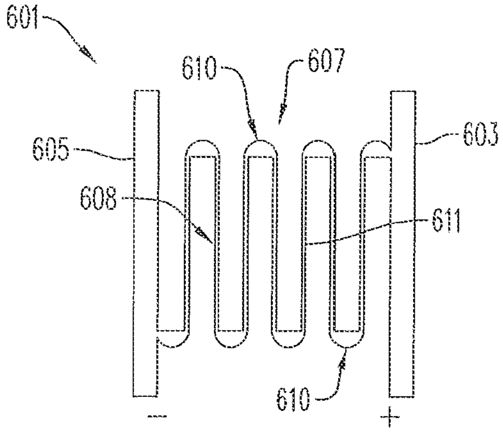
FIG. 6 shows a third embodiment of a heater.

FIG. 6 shows a third embodiment of the heater. In the embodiment of FIG. 6, the heater 601 includes an electrically positive connector blade 603 and an electrically negative connector blade 605. Heating element 607 extends between the blades 603, 605. One or both blades are integrally formed with the heating element.

In the embodiment of FIG. 6, the heating element 607 includes longitudinal portions 608 of heating element (that is to say, portions which extend substantially parallel to the connector blades 603, 605 or substantially parallel to the elongate axis of the heater). The longitudinal portions of the heating element may be joined by alternate transverse portions 610 of the heating element arranged at the extremities of the longitudinal portions of the heating element. The transverse portions may extend substantially perpendicular to the longitudinal portions of the heating element.

In FIG. 6, the transverse portions 610 include generally semicircular portions. In FIG. 6, the generally semicircular portions have their curved surface facing away from the middle portion 611 of the longitudinal portion 608 of the heating element, although this need not be the case. As in the previous embodiment, the structure of the heating element is substantially that of a square wave. The particular shape of the square wave, including its orientation, and its height relative to the distance between adjacent peaks and troughs, may be varied as described in relation to FIG. 2.

Similar to the embodiment shown in FIG. 5, the shape variation affects the resistive heating produced by the heating element and hence the heat distribution around the capillary wick. In particular, providing a portion or portions of the heating element having a greater cross sectional area reduces the likelihood of hot spots and provides a more uniform heat distribution. In the preferred embodiment, the largest cross sectional area of the heating element may be about twice the smallest cross sectional area of the heating element.

Preferably, the heater of FIG. 6 is assembled around a capillary wick in the same way as shown in FIGS. 3 and 4. Features of that assembly are described in relation to FIGS. 3 and 4 and will not be repeated. The heating element in FIG. 6 includes an electrically resistive material and the various properties of the heater and heating element are described in relation to FIGS. 2, 3 and 4 and will not be repeated. Assembly of the heater around the capillary wick is discussed below in relation to FIGS. 17, 18 and 19.

Figure 7:
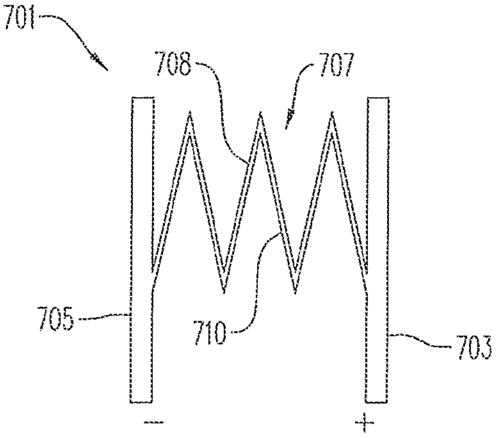
FIG. 7 shows a fourth embodiment of a heater.

FIG. 7 shows a fourth embodiment of a heater. In the embodiment of FIG. 7, the heater 701 includes an electrically positive connector blade 703 and an electrically negative connector blade 705. Heating element 707 extends between the blades 703, 705. In the embodiment of FIG. 7, the heating element 707 has the shape of a triangular wave. That is to say, heating element 707 includes elongate portions 708 that extend diagonally in a first direction from blade 705 towards blade 703 and elongate portions 710 that extend diagonally in a second direction from blade 705 towards blade 703. Portions 708 and portions 710 are linked alternately, so as to form a substantially triangular wave shape. In particular, the heating element 707 does not include portions which are substantially parallel to the connector blades or substantially perpendicular to the connector blades. All portions of the heating element are angled to the connector blades.

In the embodiment shown in FIG. 7, the angle between the elongate portions 708, 710 and the connector blades 703, 705 is about 15°. Further, the angle between elongate portions 708, 710 of the heating element is about 30°. (Note that these angles are not shown accurately in FIG. 7.) These angles have the advantage that more of the elongate portions 708, 710 are in contact with the wick than would be the case if the angle between the blade and elongate portion were larger, for example 80°. In this embodiment, the triangular wave shape has a distance from peak to trough which is about twice the distance between adjacent peaks or troughs of the wave.

Preferably, the heater of FIG. 7 is assembled around a capillary wick in the same way as shown in FIGS. 3 and 4. Features of that assembly are described in relation to FIGS. 3 and 4 and will not be repeated. As well as adjusting the heat distribution around the capillary wick, the triangular shape of the heating element ensures a good contact between the heating element 707 and the capillary wick 117 as the device is assembled. In particular, the inventors have found that the triangular shape of the heating element makes it easier to roll around the wick, as it is less stiff than heating elements having other shapes. Assembly will be discussed further in relation to FIGS. 17, 18 and 19.

The heating element in FIG. 6 includes an electrically resistive material and the various properties of the heater and heating element are described in relation to FIGS. 2, 3 and 4 and will not be repeated. In addition, for the embodiment of FIG. 7, the elongate diagonally extending portions may extend at any appropriate angle. The elongate portions 708 need not extend at the same, but opposite, angle as elongate portions 710.

Figure 8:
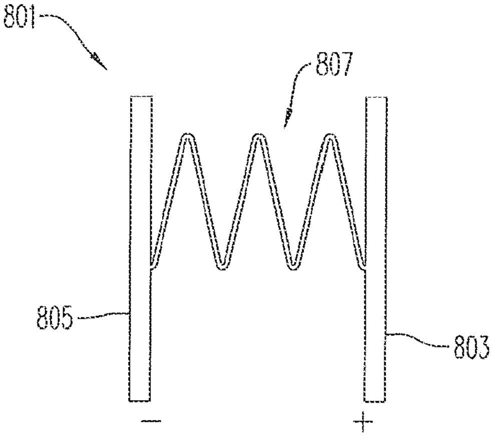
FIG. 8 shows a fifth embodiment of a heater.

FIG. 8 shows a fifth embodiment of a heater according to the invention. In the embodiment of FIG. 8, the heater 801 includes an electrically positive connector blade 803 and an electrically negative connector blade 805. Heating element 807 extends between the blades 803, 805. In the embodiment of FIG. 8, the heating element 807 has the form of a substantially triangular wave shape, similar to that in the embodiment shown in FIG. 7.

In the embodiment shown in FIG. 8, the angle between the elongate portions and the connector blades is about 15°. Further, the angle between elongate portions of the heating element is about 30°. (Again, note that these angles are not shown accurately in FIG. 8.) These angles have the advantage that more of the elongate portions are in contact with the wick than would be the case if the angle between the blade and elongate portion were larger, for example about 80°. In this embodiment, the triangular wave shape has a distance from peak to trough which is about twice the distance between adjacent peaks or troughs of the wave.

However, in the embodiment shown in FIG. 8, the peaks and troughs of the triangular wave are not pointed, as in the embodiment shown in FIG. 7. Instead, the peaks and troughs are curved or rounded peaks and troughs. That is to say, heating element 807 has substantially the shape of a sinusoidal wave. The heating element has a similar shape to the heating element of FIG. 7, but the diagonally extending portions are connected by curves. In particular, like the embodiment of FIG. 7, the heating element 807 does not include large portions which are substantially parallel to the connector blades or substantially perpendicular to the connector blades. Other than in the curved portions, all portions of the heating element are angled to the connector blades.

The heater of FIG. 8 is assembled around a capillary wick in the same way as shown in FIGS. 3 and 4. Features of that assembly are described in relation to FIGS. 3 and 4 and will not be repeated. As well as adjusting the heat distribution around the capillary wick, the wave shape of the heating element ensures a good contact between the heating element 807 and the capillary wick 117 as the device is assembled. In particular, the inventors have found that the wave shape of the heating element makes it easier to roll around the wick, as it is less stiff than other shaped heating elements. Assembly will be discussed further in relation to FIGS. 17, 18 and 19.

The heating, element in FIG. 8 includes an electrically resistive material and the various properties of the heater and heating element are described in relation to FIGS. 2, 3 and 4 and will not be repeated. In addition, for the embodiment of FIG. 8, the elongate diagonally extending portions may extend at any appropriate angle. The heating element does not need to have an exact sinusoidal shape, but may have any suitable curvy shape.

Figure 9:
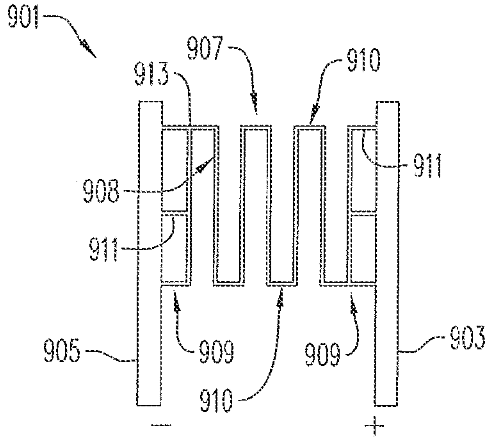
FIG. 9 shows a sixth embodiment of a heater.

FIG. 9 shows a sixth embodiment of a heater. In the embodiment of FIG. 9, the heater 901 includes an electrically positive connector blade 903 and an electrically negative connector blade 905. Heating element 907 extends between the connector blades 903, 905. One or more of the blades is integrally formed with the heating element. In the embodiment of FIG. 9, the heating element 907 includes one or more elongate longitudinal portions 908 (that is to say, portions which extend substantially along, or substantially parallel to, the elongate axis of the heater). The longitudinal portions 908 may be substantially parallel to the connector blades 903, 905.

Preferably, the longitudinal portion or portions of the heating element are joined by alternate transverse portions 910 of the heating element arranged at extremities of the longitudinal portions of the heating element. The transverse portions may be joined to or connect to further longitudinal portions of the heating element. One transverse portion connects one longitudinal portion to one connector blade. Another transverse portion connects one longitudinal portion to the other connector blade. The transverse portions may extend substantially perpendicular to the connector blades 903, 905. Similar to the embodiments of FIGS. 2, 5 and 6, the resulting structure has the shape of a square wave. The particular shape of the square wave, including its orientation, and its height relative to the distance between adjacent peaks and troughs, may be varied as described in relation to FIG. 2.

However, in the embodiment of FIG. 9, the heater further includes two reinforcing portions 909 adjacent the connector blades 903 and 905. Each reinforcing portion 909 includes several struts 911 connecting the connector blade with the closest longitudinally extending portion 908 of the heating element. One or more of the struts 911 may be substantially perpendicular to the longitudinal portion of the heating element. One or more of the struts 911 may be substantially perpendicular to one or more of the connector blades 903, 905. A strut may be positioned about half way along the closest longitudinal portion of the heating element. A further strut may be positioned at one or both extremities of the longitudinal portion of the heating element. One or more of the connector blades may include a reinforcing portion 909.

If the reinforcing portion 909 is electrically conducting, this results in several electrical connection paths from each connector blade to the closest longitudinally extending portion 908 of the heating element 907. However, the electrical current predominantly does not flow along the reinforcing portion, because this portion has a higher resistance than the shorter transverse portion 913 of the heating element, because of its greater length. Therefore, the reinforcing portion 909 does not heat up as much as the rest of the heater. Otherwise, if the reinforcing portion is not electrically conducting, only a single electrical connection path may be provided.

The reinforcing portions 909 may be made from a material that is more rigid than the heating element 907, but more flexible than the connector blades 903, 905. Preferably the reinforcing portions 909 are made from the same material as the rest of the heater. Preferably, one or more of the reinforcing portions may be integrally formed with the heating element. The cross-sectional dimension of the reinforcing portion may be larger than the cross-sectional dimension of the heating element, in order to further strengthen the reinforcing portion.

In another embodiment, not shown in the drawings, the reinforcing portion may include a sheet of material, which is preferably the same material as the heating element or connector blades. In that case, the reinforcing portion joins the connector blade and the longitudinal portion of the heating element closest to the connector blade with sheet material of substantially rectangular or square shape. Referring to FIG. 9, this would include a sheet of material extending from the uppermost or lowermost strut 911 to the middle strut 911 or a sheet of material extending from the transverse portion 913 to the middle strut 911 or both. These filled reinforcing portions may also be integrally formed with the heating element.

The heater of FIG. 9 is assembled around a capillary wick in the same way as shown in FIGS. 3 and 4. Features of that assembly are described in relation to FIGS. 3 and 4 and will not be repeated. Depending on the rigidity of the reinforcing portions 909, those portions may bend less than or the same amount as the heating element 907. The reinforcing portions strengthen the structure of the heater. The reinforcing portions also ensure a good contact of the heating element and the capillary wick and allow the heating element to closely fit around the capillary wick, when the device is assembled. This is due to a spring effect when the heater is folded into the substantially tubular shape, shown in FIGS. 3 and 4. The folded metal ensures good contact of the heating element on the capillary wick. Assembly will be discussed further in relation to FIGS. 17, 18 and 19.

The heating element in FIG. 9 includes an electrically resistive material and the various properties of the heater and heating element are described in relation to FIGS. 2, 3 and 4 and will not be repeated. In addition, the shape and size of the reinforcing portions may be varied. For example, the reinforcing portions may include a solid portion of material for example as a flag or flange extending from the connector blade, rather than individual struts. Only a single reinforcing portion may be provided.

Alternatively, more than one reinforcing portion may be provided adjacent each connector blade. The reinforcing portions may include any suitable material. The material is preferably more rigid than the material of the heating element in order to strengthen the structure of the heater. The reinforcing portions need not both have the same structure or be made from the same material. However, preferably the reinforcing portions are made from the same material as the rest of the heater. Preferably one or more of the reinforcing portions is integrally formed with the heating element.

The reinforcing portions provided in the embodiment of FIG. 9 may be provided with any other suitable heating element shape, including the shapes shown in FIGS. 2, 5, 6, 7 and 8.

Figure 10:
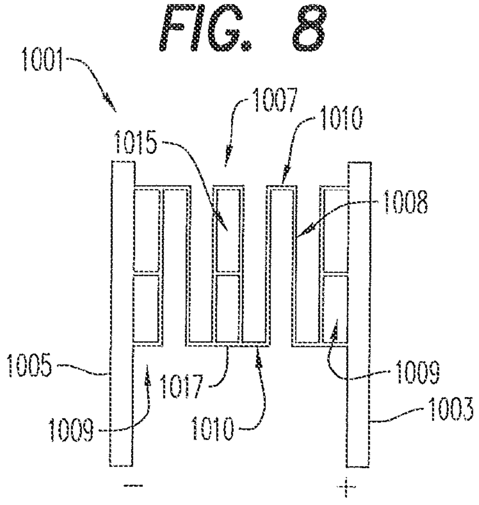
FIG. 10 shows a seventh embodiment of a heater.

FIG. 10 shows a seventh embodiment of the heater. In the embodiment of FIG. 10, the heater 1001 includes an electrically positive connector blade 1003 and an electrically negative connector blade 1005. Heating element 1007 extends between the blades 1003, 1005. One or more of the blades is integrally formed with the heating element. In the embodiment of FIG. 10, the heating element 1007 includes portions 1008 of longitudinally extending heating element (that is to say, portions which extend substantially along, or substantially parallel to, the elongate axis of the heater).

The longitudinal portions 1008 of the heating element are joined by alternate transverse portions 1010 of the heating element arranged at extremities of the longitudinal portions of the heating element. The transverse portions may extend substantially perpendicular to the connector blades 1003, 1005. Similar to the embodiments of FIGS. 2, 5, 6 and 9, the resulting structure has the shape of a square wave. The particular shape of the square wave, including its orientation, and its height relative to the distance between adjacent peaks and troughs, may be varied as described in relation to FIG. 2.

As in the embodiment of FIG. 9, the heater further includes two reinforcing portions 1009 adjacent the connector blades 1003 and 1005. The properties of those reinforcing portions 1009 are similar to those of reinforcing portions 909 in FIG. 9, and will not be repeated.

The heater 1001 further includes an additional reinforcing portion 1015 between the two connector blades, in the center of the heating element in this embodiment. Reinforcing portion 1015 may be very similar in structure to the reinforcing portions 1009. For example, the reinforcing portion 1015 may include several struts connecting adjacent longitudinally extending portions 1008. If the reinforcing portion 1015 is electrically conducting, this results in several electrical connection paths between the two adjacent vertically extending portions 1008.

However, the electrical current predominantly does not flow along the reinforcing portion 1015, because this portion has a higher resistance than the shorter transverse portion 1017 of the heating element, because of its greater length. Therefore, the reinforcing portion 1015 does not heat up as much as the rest of the heater. If the reinforcing portion 1015 is not electrically conducting, only a single electrical connection path may be provided. More than one central 1015 reinforcing portion may be provided if desired.

The reinforcing portions 1009, 1015 may be made from a material that is more rigid than the heating element 1007, but more flexible than the connector blades 1003, 1005. However, preferably the reinforcing portions 1009, 1015 are made from the same material as the rest of the heater. Preferably, one or more of the reinforcing portions may be integrally formed with the heating element. The cross-sectional dimension of the reinforcing portion may be larger than the cross-sectional dimension of the heating element, in order to further strengthen the reinforcing portion.

As described in reference to FIG. 9, one or more of the reinforcing portions may alternatively include a sheet of material.

The heater of FIG. 10 is assembled around a capillary wick in the same way as shown in FIGS. 3 and 4. Features of that assembly are described in relation to FIGS. 3 and 4 and will not be repeated. Depending on the rigidity of the reinforcing portions 1009, 1015, those portions may bend less than or the same amount as the heating element 1007. The reinforcing portions strengthen the structure of the heater. The reinforcing portions also ensure a good contact of the heating element and the capillary wick and allow the heating element to closely fit around the capillary wick, when the device is assembled. This is due to a spring effect of the folded metal sheet, as previously described. This will be discussed further in relation to FIGS. 17, 18 and 19.

The heating element in FIG. 10 includes an electrically resistive material and the various properties of the heater and heating element are described in relation to FIGS. 2, 3 and 4 and will not be repeated.

In addition, the shape, size, structure and material of the reinforcing portions may be varied as described in relation to FIG. 9. A reinforcing portion in the heating element may be provided together or separately from the reinforcing portion or portions adjacent the connector blades.

The reinforcing portions provided in the embodiment of FIG. 10 may be provided with any other suitable heating element shape, including the shapes shown in FIGS. 2, 5, 6, 7 and 8.

Figure 11:
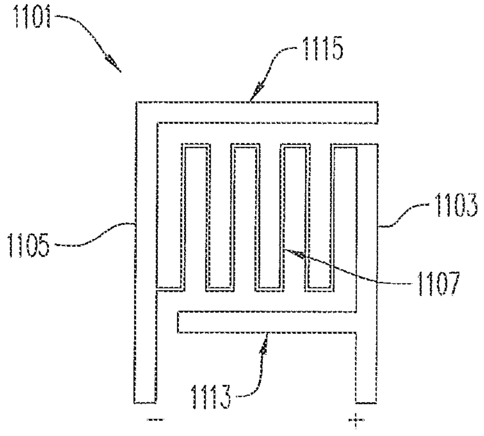
FIG. 11 shows an eighth embodiment of a heater.

FIG. 11 shows an eighth embodiment of a heater. In the embodiment of FIG. 11, the heater 1101 includes an electrically positive connector blade 1103 and an electrically negative connector blade 1105. Heating element 1107 extends between the connector blades 1103, 1105. One or more of the blades is integrally formed with the heating element. In the embodiment of FIG. 11, the heating element 1107 includes portions of longitudinally extending heating element (that is to say, portions which extend substantially along or parallel to, the elongate axis of the heater). The longitudinal portions may be parallel to the elongate connector blades 1103, 1105.

The longitudinal portions of the heating element are joined by alternate transverse portions of heating element arranged at extremities of the longitudinal portions of the heater. The transverse portions may extend substantially perpendicular to the connector blades 1103, 1105. The resulting structure has the shape of a square wave. The particular shape of the square wave, including its orientation, and its height relative to the distance between adjacent peaks and troughs, may be varied as described in relation to FIG. 2.

In the embodiment of FIG. 11, the heater further includes a lower reinforcing strut 1113 and an upper reinforcing strut 1115. In this embodiment, the lower reinforcing strut 1113 is an extension of the positive connector blade 1103. The lower reinforcing strut 1113 extends from the positive connector blade 1103 in a perpendicular direction at a height on the positive connector blade 1103 lower than the heating element 1107. That is to say, when the heater is assembled around a capillary wick, the lower reinforcing strut 1113 will be closer to the liquid cartridge 113 than the heater 1107. The lower reinforcing strut 1113 extends towards the negative connector blade 1105 but does not make contact with it.

Similarly, the upper reinforcing strut 1115 is an extension of the negative connector blade 1105. The upper reinforcing strut 1115 extends from the negative connector blade 1105 in a perpendicular direction at a height on the negative connector blade 1105 that is higher than the heating element 1107. That is to say, when the heater is assembled around a capillary wick, the upper reinforcing strut 1115 will be further from the liquid cartridge 113 than the heater 1107. The upper reinforcing strut 1115 extends towards the positive connector blade 1103 but does not make contact with it. The negative connector blade could alternatively be connected to the lower reinforcing strut. The positive connector blade could alternatively be connected to the upper reinforcing strut. In addition, only one of the upper and lower reinforcing struts need be provided.

Preferably, the lower reinforcing strut is made from the same material as the connector blade to which it is attached, the positive connector blade 1103 in FIG. 11. Similarly, preferably, the upper reinforcing strut is made from the same material as the connector blade to which it is attached, which is the negative connector blade 1105 in FIG. 11. Preferably, the lower strut or the upper strut or both are integrally formed with the heating element.

Figure 12:
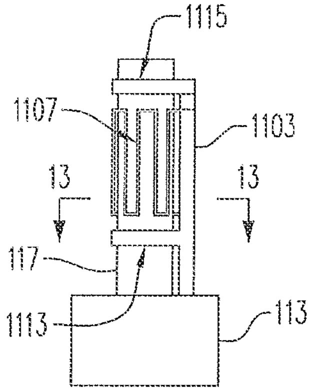
FIG. 12 shows the heater of FIG. 11 in position around a capillary wick.
Figure 13:
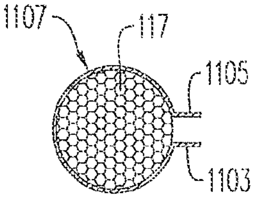
FIG. 13 is a cross section along line 13-13 of FIG. 12.

FIG. 12 shows the heater 1101 of FIG. 11 assembled around a capillary wick 117. FIG. 13 is a cross section along line 13-13 of FIG. 12. FIG. 12 shows only the capillary wick 117 and heater, plus the top portion of the liquid cartridge 113. The remaining components of the smoking system are not shown. That is to say, FIG. 12 shows an enlarged view of box A in FIG. 1. FIGS. 12 and 13 are similar to FIGS. 3 and 4 and features of the assembly that are described in relation to FIGS. 3 and 4 will not be repeated. Referring to FIGS. 12 and 13, the lower reinforcing strut 1113 extends substantially all the way around the capillary wick 117. The lower reinforcing strut 1113 is closer to the liquid cartridge 113 than the heating element 1107. The upper reinforcing strut 1115 extends substantially all the way around the capillary wick 117. The upper reinforcing strut 1115 is further from the liquid cartridge 113 than the heating element 1107.

The reinforcing struts 1113, 1115 strengthen the structure of the heater. The reinforcing struts 1113, 1115 preferably include the same material as the connector blades 1103, 1105, which is more rigid than the material of the heating element 1107. The reinforcing struts also ensure a good contact of the heating element and the capillary wick and allow the heating element to closely fit around the capillary wick, when the device is assembled. Assembly will be discussed further in relation to FIGS. 17, 18 and 19. In addition, the reinforcing struts 1113, 1115 provide support for the capillary wick 117 when the device is assembled. If the heater includes only a relatively flexible material, the capillary wick may have a tendency to flop or slump outward towards the top. The relatively rigid upper and lower reinforcing struts reduce this likelihood.

The heating element in FIGS. 11, 12 and 13 includes an electrically resistive material and the various properties of the heater and heating element are described in relation to FIGS. 2, 3 and 4 and will not be repeated. In addition, the shape and size of the upper and lower reinforcing struts may be varied. The reinforcing struts may include any suitable material. Only one of the upper and lower reinforcing struts need be provided. The reinforcing portions shown in FIGS. 9 and 10 may also be provided in conjunction with the upper and lower reinforcing struts.

The reinforcing struts provided in the embodiment of FIGS. 11, 12 and 13 may be provided with any other suitable heating element shape, including the shapes shown in FIGS. 2, 5, 6, 7 and 8.

Figure 14:
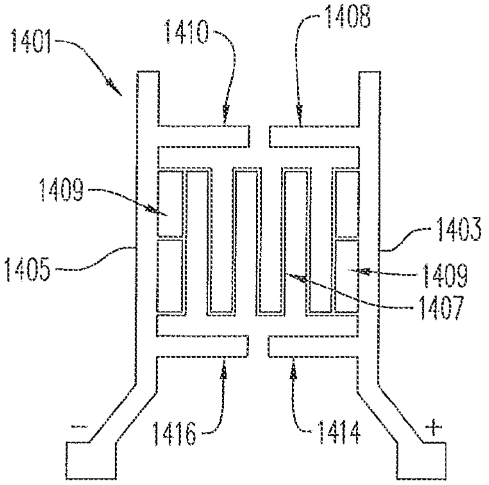
FIG. 14 shows a ninth embodiment of a heater.

FIG. 14 shows a ninth embodiment of a heater. In the embodiment of FIG. 14, the heater 1401 includes an electrically positive connector blade 1403 and an electrically negative connector blade 1405. Heating element 1407 extends between the connector blades 1403, 1405. One or more of the blades may be integrally formed with the heating element. In the embodiment of FIG. 14, the heating element 1407 includes portions of longitudinally extending heating element (that is to say, portions which extend substantially along, or substantially parallel to, the elongate axis of the heater). The longitudinal portions may be parallel to the connector blades 1403, 1405.

The longitudinal portions of the heating element are joined by alternate transverse portions of the heating element arranged at extremities of the longitudinal portions of the heater. The transverse portions may extend substantially perpendicular to the connector blades 1403, 1405. The resulting structure has the shape of a square wave. The particular shape of the square wave, including its orientation, and its height relative to the distance between adjacent peaks and troughs, may be varied as described in relation to FIG. 2.

In the embodiment of FIG. 14, the heater further includes two reinforcing portions 1409 adjacent the connector blades 1403 and 1405, as in FIG. 9. The properties of those reinforcing portions 1409 are similar to those of reinforcing portions 909 in FIG. 9, and will not be repeated.

In FIG. 14, the heater further includes two upper reinforcing struts 1408 and 1410 and two lower reinforcing struts 1414 and 1416. In this embodiment, lower reinforcing strut 1414 is an extension of the positive connector blade 1403. Lower reinforcing strut 1414 extends from the positive connector blade 1403 in a perpendicular direction at a height on the positive connector blade 1403 lower than the heating element 1407. Similarly, lower reinforcing strut 1416 is an extension of the negative connector blade 1405. Lower reinforcing strut 1416 extends from the negative connector blade 1405 in a perpendicular direction at a height on the negative connector blade 1405 lower than the heating element 1407. That is to say, when the heater is assembled around a capillary wick, the lower reinforcing struts 1414, 1416 will be closer to the liquid cartridge 113 than the heating element 1407. They will also be at about the same height as one another. The lower reinforcing struts 1414, 1416 extend towards one another, but do not make contact.

Similarly, in this embodiment, upper reinforcing strut 1408 is an extension of the positive connector blade 1403. Upper reinforcing strut 1408 extends from the positive connector blade 1403 in a perpendicular direction at a height on the positive connector blade 1403 higher than the heating element 1407. Similarly, upper reinforcing strut 1410 is an extension of the negative connector blade 1405. Upper reinforcing strut 1410 extends from the negative connector blade 1405 in a perpendicular direction at a height on the negative connector blade 1405 higher than the heating element 1407. That is to say, when the heater is assembled around a capillary wick, the upper reinforcing struts 1408, 1410 will be further from the liquid cartridge 113 than the heating element 1407. They will also be at about the same height as one another. The upper reinforcing struts 1408, 1410 extend towards one another, but do not make contact.

The two lower reinforcing struts need not be at the same height. The two upper reinforcing struts need not be at the same height. In addition, only one of the upper and lower reinforcing struts need be provided. Preferably, the lower reinforcing struts are made from the same material as the connector blades to which they are attached. Similarly, preferably, the upper reinforcing struts are made from the same material as the connector blades to which they are attached. Preferably, one or both lower struts or one or both upper struts or both are integrally formed with the heating element.

Figure 15:
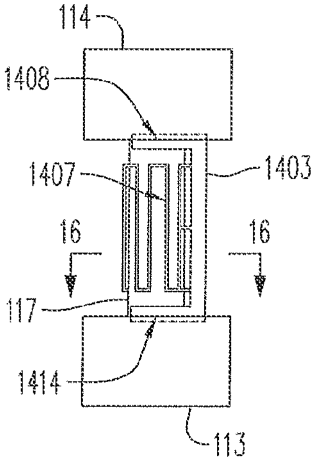
FIG. 15 shows the heater of FIG. 14 in position around a capillary wick.
Figure 16:
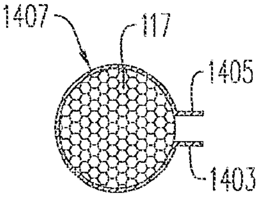
FIG. 16 is a cross section along line 16-16 of FIG. 15.

FIG. 15 shows the heater 1401 of FIG. 14 assembled around a capillary wick 117. FIG. 16 is a cross section along line 16-16 of FIG. 15. FIG. 15 shows only the capillary wick 117 and heater, plus the top portion of the liquid cartridge 113. The remaining components of the smoking system are not shown, That is to say, FIG. 15 shows an enlarged view of box A in FIG. 1. In addition, the liquid cartridge 113 in FIG. 15 includes an upper portion 114 at the top of the capillary wick 117. The upper portion 114 may be an extension of part of the liquid cartridge 113. That is to say they may be formed from the same piece of material.

FIGS. 15 and 16 are similar to FIGS. 3 and 4 and features of the assembly that are described in relation to FIGS. 3 and 4 will not be repeated. As can be seen in FIGS. 15 and 16, the connector blades 1403, 1405 are secured to the top of the liquid cartridge 113 and to the bottom of the upper portion 114 of the liquid cartridge. However, they could be secured to another part of the device or to only one of the liquid cartridge 113 and the upper portion 114. In addition, the lower reinforcing struts 1414, 1416 may extend substantially all the way around the capillary wick 117. In this embodiment, the lower reinforcing struts 1414, 1416 are secured in a substantially circular groove (not shown) in the liquid cartridge 113. The upper reinforcing struts 1408, 1410 extend substantially all the way around the capillary wick 117. In this embodiment, the upper reinforcing struts 1408, 1410 are secured in a substantially circular groove (not shown) in the upper portion 114 of the liquid cartridge.

The reinforcing struts 1408, 1410, 414, 1416 strengthen the structure of the heater. The reinforcing struts 1408, 1410, 414, 1416 may include the same material as the connector blades 1403, 1405, which is more rigid than the material of the heating element 1407. In addition, securing the reinforcing struts 1414, 1416 in a groove in the liquid cartridge 113 provides additional structural integrity. In addition, securing the reinforcing struts 1408, 1410 in a groove in the upper portion 114 of the liquid cartridge provides additional structural integrity. One or more of the reinforcing struts may be integrally formed with the heating element.

The reinforcing struts also ensure a good contact of the heating element and the capillary wick and allow the heating element to closely fit around the capillary wick, when the device is assembled. This will be discussed further in relation to FIGS. 17, 18 and 19. In addition, the reinforcing struts, especially in conjunction with the upper portion 114 of the liquid cartridge and the grooves in the liquid cartridge 113 and in the upper portion 114 of the liquid cartridge provide support for the capillary wick 117 when the device is assembled. If the heater includes only a relatively flexible material, the capillary wick may have a tendency to flop or slump outward towards the top. The relatively rigid upper and lower reinforcing struts secured in the grooves reduce this likelihood.

The heating element in FIGS. 14, 15 and 16 includes an electrically resistive material and the various properties of the heater and heating element are described in relation to FIGS. 2, 3 and 4 and will not be repeated. In addition, the shape and size of the upper and lower reinforcing struts may be varied. For example, the two lower reinforcing struts may not have the same length or shape. For example, the two upper reinforcing struts may not have the same length or shape. The reinforcing struts may include any suitable material. Only one of the upper and lower reinforcing struts need be provided. The reinforcing portions shown in FIGS. 9 and 10 may also be provided in conjunction with the upper and lower reinforcing struts. The reinforcing struts need not be secured in the liquid cartridge by grooves, although this improves the structural integrity. The shape of the grooves may be used to bend the heating element into shape around the capillary wick as desired.

The reinforcing struts provided in the embodiment of FIGS. 14, 15 and 16 may be provided with any other suitable heating element shape, including the shapes shown in FIGS. 2, 5, 6, 7 and 8.

Note that a number of different embodiments have been described, and features described in relation to one embodiment may often be applicable to another embodiment.

Figure 17:
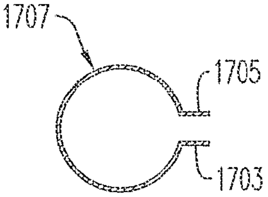
FIGS. 17, 18 and 19 show the steps involved in assembling a heater around a capillary wick, according to a preferred embodiment.
Figure 18:
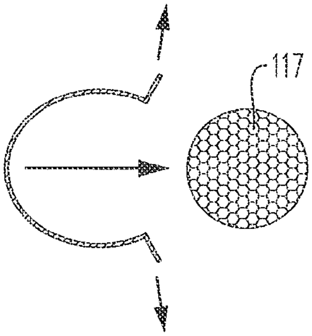
Figure 19:
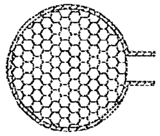

FIGS. 17, 18 and 19 show the steps involved in assembling a heater around a capillary wick, according to one embodiment. The heater may take the form shown in any of FIGS. 2 to 16.

Referring to FIG. 17, firstly the heating element 1707 is curved around by bringing the connector blades 1703, 1705 towards one another, preferably using a folding tool. In this case, the folding tool forms the heater into the shape of a cylinder with a substantially round cross section. Once the heater is formed, the wick 117 may be inserted inside it as shown in FIGS. 18 and 19. The spring effect of folded metal ensures good contact of the heater on the wick. The diameter of the folded heater may be slightly smaller than the diameter of the wick, to ensure good contact. For example, the folded heater may have a diameter of about 1.9 mm, for a wick diameter of about 2.0 mm.

In this way, the elasticity of the heating element ensures that the heater is biased to spring inwards towards the wick when the folded heater is drawn apart in the direction of the arrows shown in FIG. 18. Referring to FIG. 18, the heating element is secured around capillary wick 117 by moving the opened heating element towards the wick 117 as shown by the arrow. The heating element is then released and, as shown in FIG. 19, the blades 1703, 1705 are secured on one side of the capillary wick, and the heating element is positioned closely around the capillary wick.

As already mentioned, the heating element has a particular elasticity, which is affected by the thickness of the material sheet used for the heating element, the shape into which the sheet has been cut and the elasticity (that is, Young's modulus) of the sheet. In particular, the triangular and sinusoidal shaped heating elements have been found to be particularly advantageous for assembly. In addition, if the heater includes reinforcing portions, this will also affect the overall elasticity of the heater. When the connector blades are secured, this elasticity ensures a close fit around the capillary wick. This ensures consistency in the heat distribution and hence in the aerosol formation. This ensures repeatability of the smoking experience.

Figure 20:
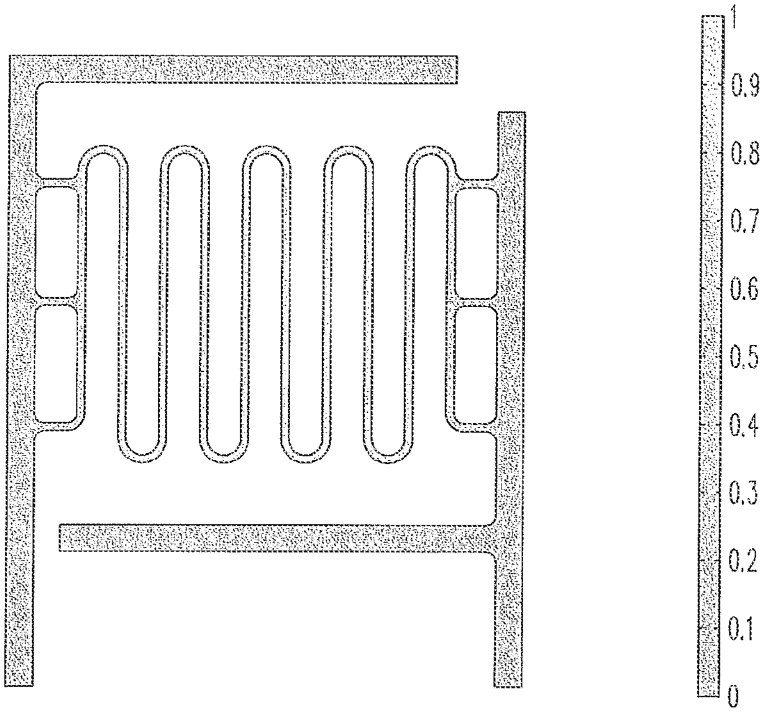
FIGS. 20 and 21 show the temperature distribution of two heaters when an electrical current is flowing.
Figure 21:
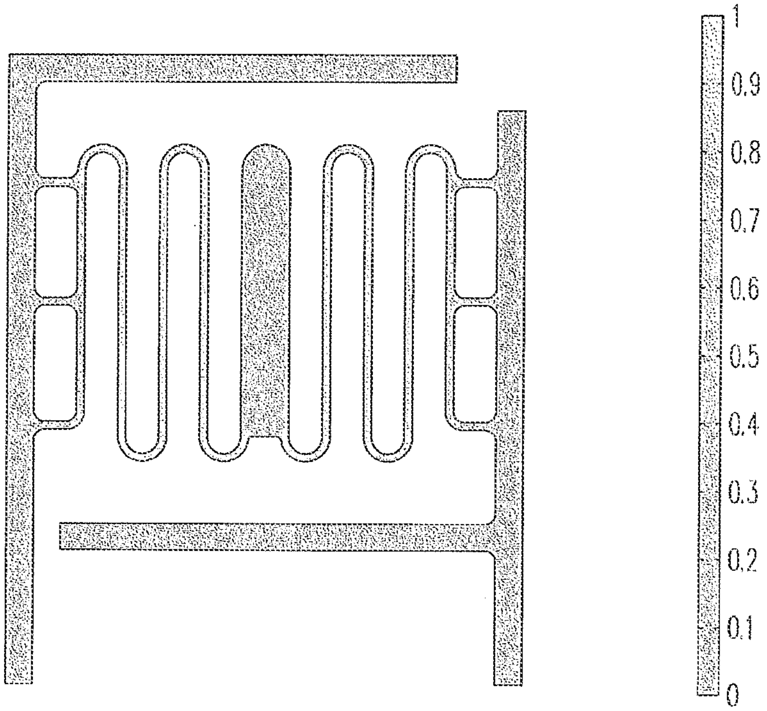

FIGS. 20 and 21 show the temperature distribution of two heaters according to the embodiments described herein.

The heater of FIG. 20 is similar to the embodiment shown in FIG. 9, except that the transverse portions of the heating element take the form of a semicircular arc. The heater shown in FIG. 20 also includes an upper reinforcing strut and a lower reinforcing strut, similar to the embodiment shown in FIG. 11. Both the upper strut and lower strut are, however, optional; none, one, or both the reinforcing struts may be included.

The temperature scale on the right hand side of FIG. 20 is a linear scale with the darker portions of the scale being cooler than the paler portions of the scale. It can be seen that the hottest (palest) portion of the heater is about five times hotter than the coolest (darkest) portion of the heater. The heater predominantly heats in the heating element portion of the heater. The reinforcing portions, and upper reinforcing strut and lower reinforcing strut, as well as the connector blades, all remain cooler than the heating element portion of the heater.

The heater of FIG. 21 is similar to the embodiment shown FIG. 20 except that the central portion of the heater, that is the portion of the heater substantially equidistant from the connector blades, includes a reinforcing portion. The reinforcing portion is substantially rectangular in shape, with a semicircular portion at one end. The temperature scale on the right hand side of FIG. 21 is a linear scale with the darker portions of the scale being cooler than the paler portions of the scale. It can be seen that the hottest (palest) portion of the heater is about five times hotter than the coolest (darkest) portion of the heater. The heater predominantly heats in the heating element portion of the heater. The reinforcing portion, and upper reinforcing strut and lower reinforcing strut, as well as the connector blades all remain cooler than the heating element portion of the heater.

In this specification, the word "about" is often used in connection with numerical values to indicate that mathematical precision of such values is not intended. Accordingly, it is intended that where "about" is used with a numerical value, a tolerance of ±10% is contemplated for that numerical value.

In this specification the words "generally" and "substantially" are sometimes used with respect to terms. When used with geometric terms, the words "generally" and "substantially" are intended to encompass not only features which meet the strict definitions but also features which fairly approximate the strict definitions.

While the foregoing describes in detail a preferred improved heater for an electrically heated aerosol generating system with reference to a specific embodiment thereof, it will be apparent to one skilled in the art that various changes and modifications may be made to the improved heater and equivalents method may be employed, which do not materially depart from the spirit and scope of the invention. Accordingly, all such changes, modifications, and equivalents that fall within the spirit and scope of the invention as defined by the appended claims are intended to be encompassed thereby.

We claim:

1. A heater for an electrically heated aerosol generating system, the heater comprising:
- a first connector blade;
- a second connector blade extending parallel to the first connector blade and being separate from the first connector blade;
- a heating element coupled to and extending between the first connector blade and the second connector blade, the heating element comprising a plurality of portions extending along a height of the heater;
- a lower reinforcing strut extending from the first connector blade towards the second connector blade; and
- an upper reinforcing strut extending from the second connector blade towards the first connector blade.

2. The heater of claim 1, wherein the plurality of portions of the heating element comprises longitudinal portions extending parallel to the first connector blade and the second connector blade.

3. The heater of claim 2, wherein the plurality of portions of the heating element further comprises transverse portions extending perpendicular to the first connector blade and the second connector blade.

4. The heater of claim 3, wherein the longitudinal portions are longer than the transverse portions.

5. The heater of claim 3, wherein the longitudinal portions and the transverse portions are electrically joined such that electric current can flow through the heating element.

6. The heater of claim 1, wherein the heating element has a triangular wave shape.

7. The heater of claim 1, wherein the plurality of portions comprises:
- a first plurality of portions configured to extend diagonally in a first direction from the first connector blade to the second connector blade; and
- a second plurality of portions configured to extend diagonally in a second direction from the first connector blade to the second connector blade.

8. The heater of claim 1, wherein the heating element has a sinusoidal shape.

9. The heater of claim 1, wherein the heater has a cylindrical shape.

10. The heater of claim 1, wherein each of the first connector blade and the second connector blade has a cross section greater than a cross section of the heating element.

11. The heater of claim 1, wherein at least one of the first connector blade and the second connector blade is integrally formed with the heating element.

12. The heater of claim 1, wherein the first connector blade and the second connector blade are integrally formed with the heating element.

13. The heater of claim 1, wherein the heater is configured to surround a capillary wick of the electrically heated aerosol generating system.

14. The heater of claim 13, wherein the lower reinforcing strut and the upper reinforcing strut are configured to extend at least partially around the capillary wick to maintain the heating element in contact with the capillary wick.

15. The heater of claim 1, wherein the heating element, the upper reinforcing strut, the lower reinforcing strut, the first connector blade, and the second connector blade are formed from a single sheet of resistance heating material.

16. The heater of claim 1, wherein the lower reinforcing strut is an extension of the first connector blade and the upper reinforcing strut is an extension of the second connector blade.

17. The heater of claim 1, wherein the first connector blade is an electrically positive support element, and the second connector blade is an electrically negative support element.

18. The heater of claim 1, wherein the heating element includes an electrically resistive material.

19. The heater of claim 1, wherein the heating element further comprises at least one central reinforcing portion extending between the plurality of portions.

20. The heater of claim 1, wherein the lower reinforcing strut is a first lower reinforcing strut and the upper reinforcing strut is a first upper reinforcing strut, the heater further comprising a second lower reinforcing strut extending from the second connector blade towards the first connector blade and a second upper reinforcing strut extending from the first connector blade towards the second connector blade.

* * * * *